(12) United States Patent  
Mitsumata et al.

(10) Patent No.: US 9,046,186 B2
(45) Date of Patent: Jun. 2, 2015

(54) ELECTROMAGNETIC VALVE

(71) Applicant: DENSO CORPORATION, Kariya, Aichi-pref. (JP)

(72) Inventors: Naoki Mitsumata, Takahama (JP); Shigeru Nonoyama, Miyoshi (JP)

(73) Assignee: DENSO CORPORATION, Kariya (JP)

( * ) Notice: Subject to any disclaimer, the term of this patent is extended or adjusted under 35 U.S.C. 154(b) by 89 days.

(21) Appl. No.: 13/719,627

(22) Filed: Dec. 19, 2012

(65) Prior Publication Data

US 2013/0181149 A1 Jul. 18, 2013

(30) Foreign Application Priority Data

Jan. 13, 2012 (JP) ................................. 2012-004785

(51) Int. Cl.
*F16K 31/02* (2006.01)
*F16K 31/06* (2006.01)

(52) U.S. Cl.
CPC ............. *F16K 31/02* (2013.01); *F16K 31/0655* (2013.01); *F16K 31/0658* (2013.01); *F16K 31/0665* (2013.01); *F16K 31/0662* (2013.01); *F16K 31/0689* (2013.01)

(58) Field of Classification Search
CPC . F16K 31/02; F16K 31/0658; F16K 31/0655; F16K 31/0665; F16K 31/0662; F16K 31/0689
USPC .................................................... 251/129.15
See application file for complete search history.

(56) References Cited

U.S. PATENT DOCUMENTS

| | | | |
|---|---|---|---|
| 5,246,199 A * | 9/1993 | Numoto et al. .......... | 251/129.15 |
| 6,268,784 B1 * | 7/2001 | Feigel et al. .................. | 335/261 |
| 6,390,392 B1 * | 5/2002 | Reiter ......................... | 239/585.1 |
| 6,405,743 B1 * | 6/2002 | Spryshak et al. .................. | 137/1 |
| 6,837,478 B1 * | 1/2005 | Goossens et al. ......... | 251/129.15 |
| 6,846,049 B2 * | 1/2005 | Obersteiner et al. ........ | 303/119.2 |
| 6,955,336 B2 * | 10/2005 | Bircann et al. ........... | 251/129.15 |
| 7,108,242 B2 * | 9/2006 | Goossens et al. ......... | 251/129.15 |
| 7,578,494 B2 * | 8/2009 | Mitsumata et al. ...... | 251/129.15 |
| 7,871,060 B2 * | 1/2011 | Armour ................... | 251/129.15 |
| 2007/0062591 A1 | 3/2007 | Armour | |
| 2009/0050829 A1 * | 2/2009 | Haynes et al. ........... | 251/129.02 |
| 2013/0181149 A1 * | 7/2013 | Mitsumata et al. ...... | 251/129.01 |
| 2013/0306895 A1 * | 11/2013 | Arikawa et al. .......... | 251/129.15 |

FOREIGN PATENT DOCUMENTS

| | | |
|---|---|---|
| JP | 2007-056861 | 3/2007 |
| JP | 2009-103050 | 5/2009 |

OTHER PUBLICATIONS

Office Action (8 pages) dated Jul. 1, 2014, issued in corresponding Chinese Application No. 201210566789.8 and English translation (8 pages).

* cited by examiner

*Primary Examiner* — Matthew W Jellett
(74) *Attorney, Agent, or Firm* — Nixon & Vanderhye P.C.

(57) ABSTRACT

An electromagnetic valve includes a rod, an armature fixed to the rod, and a stopper that limits motion of the armature to one side in an axial direction of the rod. The armature has a rod hole through which a fixed portion of the rod extends to be fixed to the armature. The rod includes a flange portion that is located on the one side in the axial direction with reference to the fixed portion. The flange portion is larger than the fixed portion in a radial direction of the rod. The armature includes a contact portion adjacent to an opening of the rod hole that is open toward the one side in the axial direction, and the contact portion contacts the flange portion.

13 Claims, 3 Drawing Sheets

ONE SIDE
↑
AXIAL
DIRECTION
↓
THE OTHER SIDE

ELECTROMAGNETIC VALVE

CROSS REFERENCE TO RELATED APPLICATION

This application is based on and incorporates herein by reference Japanese Patent Application No. 2012-004785 filed on Jan. 13, 2012.

TECHNICAL FIELD

The present disclosure relates to an electromagnetic valve that includes an armature moved by magnetic attraction force, and a rod fixed to the armature.

BACKGROUND

Conventionally, an electromagnetic valve is used, for example, as a decompression valve shown in FIGS. 4A and 4B. The decompression valve discharges and decompresses high-pressure fuel stored in a common rail (e.g., JP 2009-103050 A). An electromagnetic valve 100 includes a housing 101, a rod 102 slidable in its axial direction in the housing 101, an armature 104 fixed to the rod 102 and magnetized upon energization of a solenoid coil 103 to be magnetically attracted to one side in the axial direction, and a stopper 105 that limits the motion of the armature 104 toward the one side in the axial direction by contacting at least one of the armature 104 and the rod 102. A valve body 108 is provided at a tip of the rod 102 to open or close a valve hole 109 provided in the housing 101 in accordance with the motion of the rod 102.

The armature 104 is fixed to the rod 102, for example, by press-fitting the rod 102 into a rod hole 110 provided in the armature 104. In the electromagnetic valve 100 shown in FIGS. 4A and 4B, when the armature 104 moves to the one side in the axial direction, an end of the rod 102 on the one side in the axial direction contacts the stopper 105, so that the motion of the armature 104 is limited.

When the armature 104 moves to the one side in the axial direction to contact the stopper 105, an end surface of the armature 104 on the one side in the axial direction is subjected to a fuel pressure. Accordingly, the armature 104 may be deformed so that the rod hole 110 expands as shown in FIG. 4B. As a result, the armature 104 may be damaged, and the armature 104 may be unfixed from the rod 102, so that the rod 102 can be pulled out of the rod hole 110.

Moreover, when the armature 104 is deformed, a gap between the armature 104 and a stator core 111, magnetized by the solenoid coil 103 to attract the armature 104, is changed, and the attraction force between the armature 104 and the stator core 111 may thereby reduce. As a result, responsiveness of the electromagnetic valve 100 may reduce.

It is an objective of the present disclosure to limit deformation of an armature and a rod fixed to the armature in an electromagnetic valve when the armature moves to one side in an axial direction of the rod, and when the armature or the rod contacts a stopper.

SUMMARY

According to an aspect of the present disclosure, an electromagnetic valve includes a housing, a rod, an armature and a stopper. The rod is disposed to be slidable in an axial direction of the rod in the housing. The armature has a rod hole through which the rod extends to be fixed to the armature, and the armature moves toward one side in the axial direction by a magnetic attraction force upon energization of a solenoid coil. The stopper limits the movement of the armature by contacting at least one of the armature and the rod. The rod includes a fixed portion extending through the rod hole to be fixed to the armature, and a flange portion located on the one side in the axial direction with reference to the fixed portion. The flange portion is larger than the fixed portion in a radial direction of the rod. The armature includes a contact portion provided adjacent to an opening of the rod hole that is open toward the one side in the axial direction. The contact portion extends in the radial direction, and the flange portion contacts the contact portion on the one side in the axial direction with reference to the contact portion.

Accordingly, when a load is put on the armature from the one side in the axial direction, deformation of the armature can be limited because of the contact between the flange portion and the contact portion. As a result, damage on the armature and unfixing of the armature from the rod can be limited.

The rod may include a thin portion located on the one side in the axial direction with reference to the flange portion, and the thin portion may be smaller than the flange portion in the radial direction.

Alternatively, the flange portion may be located at an end of the rod on the one side in the axial direction.

The fixed portion and the armature may be fixed with each other by press-fitting, welding, crimping or brazing, for example. The fixed portion can be fixed to the armature more strongly by adopting one of the fixing methods: welding, crimping and brazing, in addition to press-fitting.

According to another aspect of the present disclosure, an electromagnetic valve includes a housing, a rod, an armature and a stopper. The housing has a longitudinal axis, and the rod is disposed in the housing to be slidable along the longitudinal axis. The rod has a flange portion. The armature has a rod hole through which the rod extends to be fixed to the armature, and includes a contact portion provided adjacent to the rod hole. The armature moves along the longitudinal axis together with the rod by a magnetic attraction force upon energization of a solenoid coil. The stopper limits the movement of the armature and the rod by contacting at least one of the armature and the rod. The flange portion of the rod is located between the rod hole and the stopper, and is larger than the rod hole in a radial direction to be in contact with the contact portion.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
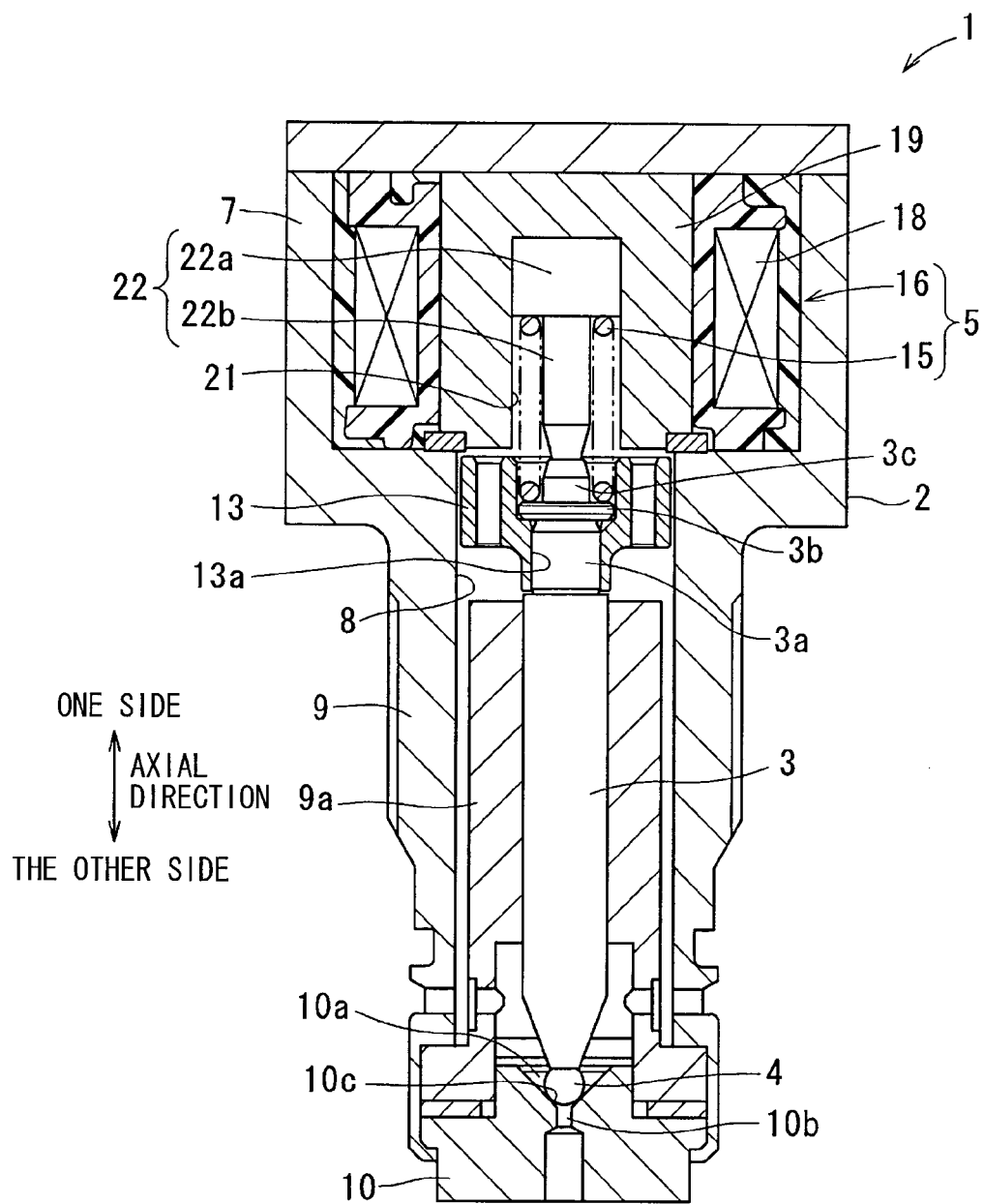
FIG. 1 is a sectional view showing a decompression valve according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

An electromagnetic valve of a first embodiment will be described in reference to FIGS. 1 and 2.

The electromagnetic valve of the first embodiment is used as a decompression valve 1 for reducing a pressure in a common rail that accumulates fuel therein at high pressure.

The decompression valve 1 includes a housing 2, a rod 3 that slides in the housing 2 in an axial direction of the rod 3, a first valve body 4 provided at a tip portion of the rod 3, and a drive portion 5 that drives the rod 3. As shown by the two-ended arrow in each drawing, an upper side in each drawing is referred to as one side in the axial direction, and a lower side in each drawing is referred to as the other side in the axial direction.

The housing 2 includes a coil housing portion 7 in which a part of the drive portion 5 is housed, a sleeve portion 9 having therein a penetration hole 8 that is provided on the other side in the axial direction with reference to the coil housing portion 7 to communicate with a space inside the coil housing portion 7, and a second valve body 10 arranged at an end of the sleeve portion 9 in the axial direction, in other words, the second valve body 10 is arranged on the other side in the axial direction with reference to the sleeve 9.

The sleeve portion 9 includes a guide 9a that guides the rod 3, and the rod 3 is slidable in the axial direction in the penetration hole 8. In other words, the rod 3 is supported by the guide 9a to be slidable in the axial direction.

The second valve body 10 is separated from the sleeve portion 9, and has a shape of an approximately circular plate. The second valve body 10 includes a valve space 10a that is open toward the sleeve portion 9 to receive the first valve body 4, and a valve hole 10b communicating with the valve space 10a. Here, a wall surface of the second valve body 10, which defines the valve space 10a, has a sheet portion 10c on which the first valve body 4 can be seated.

The rod 3 is a shaft having a cylindrical rod-like shape, and extends through the penetration hole 8 in the sleeve portion 9. The rod 3 is supported by an inner surface of the guide 9a of the sleeve portion 9 to be slidable in the axial direction. An end portion of the rod 3 on the one side in the axial direction is fixed to an armature 13 that is a part of the drive portion 5, and an end portion of the rod 3 on the other side in the axial direction contacts the first valve body 4.

Figure 2:
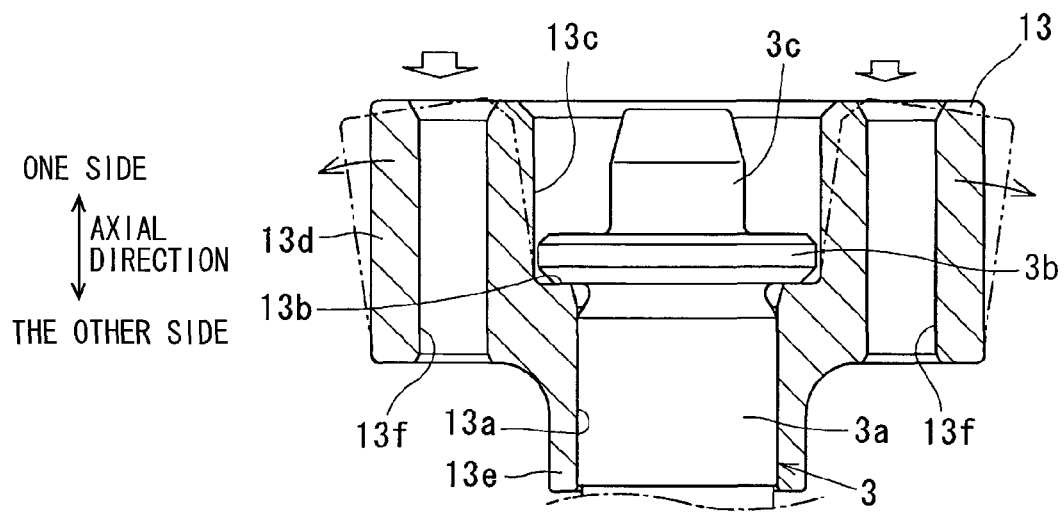
FIG. 2 is a sectional view showing a part of the decompression valve according to the first embodiment.

The first valve body 4 is, for example, a ball valve that is arranged on the other side in the axial direction with reference to the rod 3, and is pressed by a flat surface part (ball pressing surface), provided at the tip portion of the rod 3, toward the lower side in FIG. 1 (i.e., toward the other side in the axial direction). Accordingly, the first valve body 4 is seated on the sheet portion 10c of the second valve body 10. In the present embodiment, the first valve body 4 arranged at the tip portion of the rod 3 opens or closes the valve hole 10b. Alternatively, a valve body may be formed directly on the tip portion of the rod 3, and the rod 3 may directly open or close the valve hole 10b.

The drive portion 5 drives the first valve body 4 via the rod 3. The drive portion 5 includes a spring 15 and an electromagnetic actuator 16.

The spring 15 is a compression coil spring, and urges the armature 13 fixed to the rod 3 in a valve closing direction (i.e., toward the other side in the axial direction). In other words, the spring 15 provides an urging force on the first valve body 4 via the rod 3 in the valve closing direction.

The electromagnetic actuator 16 includes a cylindrical coil 18 that generates a magnetic field upon an energization thereof, a stator core 19 arranged radially inward of the coil 18 to be magnetized upon the energization of the coil 18, and the armature 13 attracted toward the magnetized stator core 19. The coil 18 and the stator core 19 are housed in the coil housing portion 7 of the housing 2.

The armature 13 is made of a magnetic material (e.g., ferromagnetic material such as Iron), and is arranged inside the penetration hole 8 so as to be opposed to the stator core 19 in the axial direction. The armature 13 is fixed to the rod 3.

The stator core 19 is made of a magnetic material (e.g., ferromagnetic material such as Iron), and has a bottomed cylindrical shape. The stator core 19 has a spring housing hole 21 that is open toward the other side in the axial direction, and is arranged inside the coil 18.

The spring housing hole 21 houses a stopper 22 and the spring 15 therein. The stopper 22 includes a base portion 22a fixed to a bottom of the spring housing hole 21, and a protrusion portion 22b smaller than the base portion 22a in a radial direction of the rod 3. The protrusion portion 22b extends from the base portion 22a toward the other side in the axial direction. The spring 15 is arranged around an outer periphery of the protrusion portion 22b. An end of the spring 15 on the one side in the axial direction is engaged with the base portion 22a, and an end of the spring 15 on the other side in the axial direction is engaged with the rod 3. The stopper 22 is located on the one side in the axial direction with reference to the rod 3 and the armature 13. The radial direction of the rod 3 may be perpendicular to the axial direction of the rod 3.

Characteristic points of the present embodiment will be described. The rod 3 includes a fixed portion 3a that is fixed to the armature 13 and is located on the one side in the axial direction with reference to a portion of the rod 3 supported by the guide 9a, a flange portion 3b that is located on the one side in the axial direction with reference to the fixed portion 3a and is larger than the fixed portion 3a in the radial direction, and a thin portion 3c that is located on the one side in the axial direction with reference to the flange portion 3b and is smaller than the flange portion 3b in the radial direction.

The armature 13 includes a rod hole 13a through which the fixed portion 3a extends to be fixed to the armature 13, and a contact portion 13b provided adjacent to an opening of the rod hole 13a that is open toward the one side in the axial direction. The contact portion 13b extends in the radial direction, and the flange portion 3b contacts the contact portion 13b on the one side in the axial direction with reference to the contact portion 13b.

In other words, the flange portion 3b is located on the one side in the axial direction with reference to the rod hole 13a, and is larger in the radial direction than the opening of the rod hole 13a that is open toward the one side in the axial direction. The contact portion 13b is located on the other side in the axial direction with reference to the flange portion 3b to contact the flange portion 3b.

For example, the armature 13 includes the rod hole 13a in which the rod 3 is fixed to the armature 13, and a large hole 13c located on the one side in the axial direction with reference to the rod hole 13a coaxially with and adjacent to the rod hole 13a. The rod hole 13a and the large hole 13c are provided in a radially center part of the armature 13, and communicate with each other. As a result, the rod hole 13a is open from the armature 13 toward the other side in the axial direction, and the large hole 13c is open from the armature 13 toward the one side in the axial direction. In other words, a side of the armature 13 on the one side in the axial direction and a side of the armature 13 on the other side in the axial direction communicate with each other through the large hole 13c and the rod hole 13a. The large hole 13c is made to be larger than the rod hole 13a in the radial direction, so that a step is provided between the rod hole 13a and the large hole 13c. The step provided between the rod hole 13a and the large hole 13c is used as an example of the contact portion 13b. The flange portion 3b is located in the large hole 13c. The contact portion 13b may have a flat surface extending in the radial direction, and the flat surface of the contact portion 13b may contact the flange portion 3b in the axial direction. The flange portion 3b may have a flat surface extending in the radial direction, and the flat surface of the flange portion 3b may contact the contact portion 13b in the axial direction. The contact portion 13b may enclose the opening of the rod hole 13a that is open toward the one side in the axial direction. The contact portion 13b may entirely contact the flange portion 3b. The contact portion 13b may have a circular ring shape enclosing the opening of the rod hole 13a that is open toward the one side in the axial direction, and the flange portion 3b may have a circular shape concentrically with the contact portion 13b.

The armature 13 further includes a slide portion 13d that slides in the axial direction in the penetration hole 8, and a small diameter portion 13e that is smaller than the slide portion 13d in the radial direction. The slide portion 13d is located on the one side in the axial direction with reference to the small diameter portion 13e. The slide portion 13d includes a through hole 13f located on a radially outer side of the rod hole 13a and the large hole 13c, and the through hole 13f penetrates through the slide portion 13d in the axial direction. An outer periphery of the small diameter portion 13e is located on a radially inner side of an opening of the through hole 13f. The through hole 13f is served as a depressurizing hole through which pressure is released when the armature 13 moves toward the one side in the axial direction.

The rod 3 is fixed to the armature 13 by press-fitting the fixed portion 3a into the rod hole 13a and by welding between an outer periphery of the fixed portion 3a and an inner periphery of the rod hole 13a. In the fixed state, the side of the contact portion 13b on the one side in the axial direction and the side of the flange portion 3b on the other side in the axial direction contact with each other. A side of the flange portion 3b on the one side in the axial direction is engaged with the end portion of the spring 15 located on the other side in the axial direction. The thin portion 3c is arranged inside the spring 15.

An operation of the decompression valve 1 will be described. When the decompression valve 1 is closed, the rod 3 is urged by the spring 15 toward the other side in the axial direction so that the first valve body 4 is pressed against the sheet portion 10c by the rod 3. When the coil 18 is energized in the closed state of the decompression valve 1, the armature 13 moves toward the one side in the axial direction by magnetic attraction force generated between the stator core 19 and the armature 13. In accordance with the movement of the armature 13, the rod 3 moves also toward the one side in the axial direction so that the first valve body 4 is separated from the sheet portion 10c. Accordingly, the valve hole 10b is opened, and the decompression valve 1 is thereby opened (in an open state). The movements of the rod 3 and the armature 13 are limited by contact between an end surface of the thin portion 3c on the one side in the axial direction and an end surface of the protrusion portion 22b on the other side in the axial direction.

Effects of the first embodiment will be described. In the present embodiment, the contact portion 13b, which is provided around the opening of the rod hole 13a that is open toward the one side in the axial direction, contacts the side of the flange portion 3b on the other side in the axial direction. Hence, when a load is put on the armature 13 from the one side in the axial direction in the open state of the decompression valve 1, a deformation of the armature 13 is limited due to the contact between the contact portion 13b and the flange portion 3b. Even when the armature 13 is deformed, only a part of the armature 13 located on the one side in the axial direction with reference to the contact portion 13b may be deformed slightly as shown in FIG. 2. Thus, the rod hole 13a can be prevented from being expanded. As a result, damage on the armature 13 and unfixing of the rod 3 from the armature 13, due to the deformation of the armature 13, can be limited. Moreover, because the deformation of the armature 13 can be limited, gap variation between the stator core 19 and the armature 13 can be reduced, and responsiveness of the decompression valve 1 (electromagnetic valve) can be thereby improved.

Second Embodiment

Figure 3:
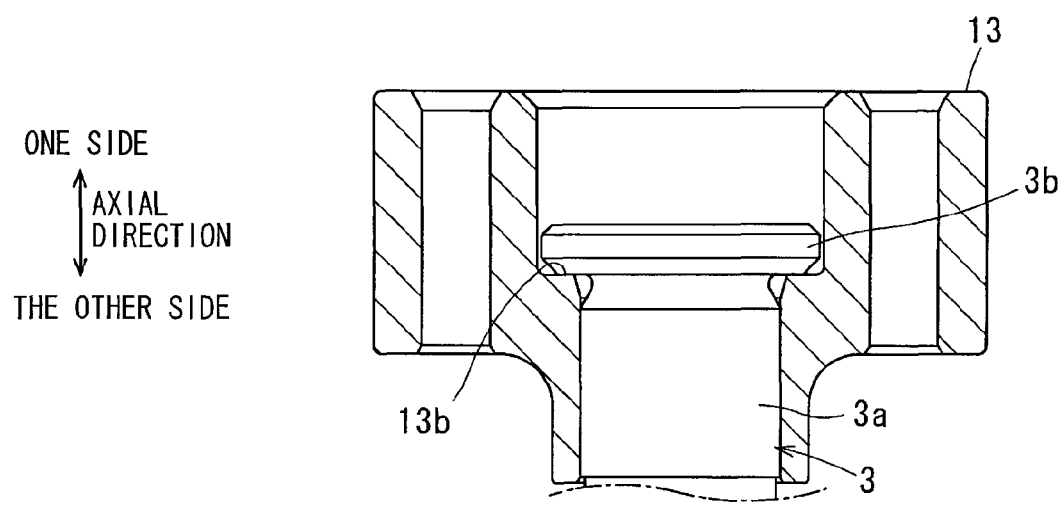
FIG. 3 is a sectional view showing a part of a decompression valve according to a second embodiment.
Figure 4A:
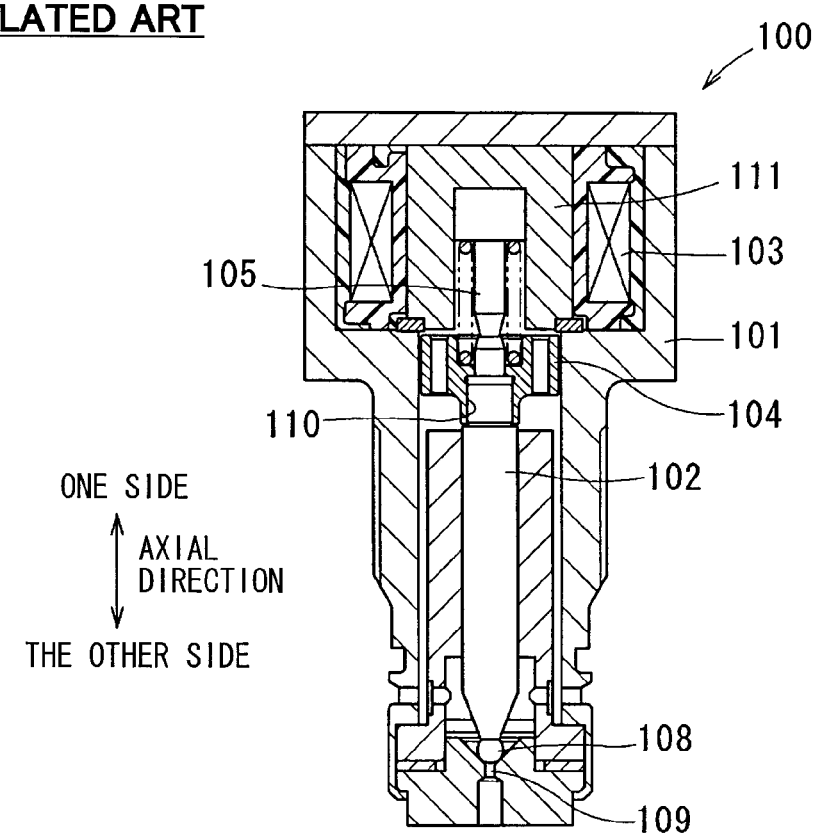
FIG. 4A is a sectional view showing a decompression valve according to a related art.
Figure 4B:
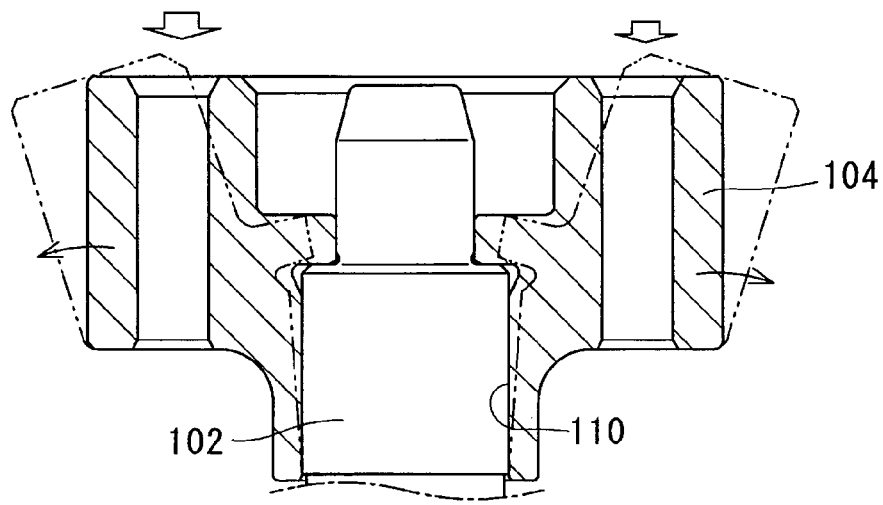
FIG. 4B is a sectional view showing a part of the decompression valve according to the related art.

A decompression valve 1 of a second embodiment will be described with reference to FIG. 3. In the second embodiment, a flange portion 3b is provided on an end portion of a rod 3 on the one side in the axial direction, and the thin portion 3c described in the first embodiment is omitted in the second embodiment. Movements of an armature 13 and the rod 3 are limited by contact between an end surface of the flange portion 3b n the one side in the axial direction and an end surface of a protrusion portion 22b on the other side in the axial direction. Also in this case, operational effects similar to those of the first embodiment can be obtained.

Although the present disclosure has been fully described in connection with the preferred embodiments thereof with reference to the accompanying drawings, it is to be noted that various changes and modifications described below will become apparent to those skilled in the art.

In the first and second embodiments, the rod 3 is fixed to the armature 13 by press-fitting the fixed portion 3a into the rod hole 13a and by welding between the outer periphery of the fixed portion 3a and the inner periphery of the rod hole 13a. However, the rod 3 may be fixed to the armature 13 only by press-fitting or one of these fixing methods: welding, crimping and brazing. In a case of the crimping, the armature 13 is crimped to the fixed portion 3a from outside of the fixed portion 3a. Furthermore, the rod 3 may be fixed to the armature 13 by press-fitting and one of the fixing methods: welding, crimping and brazing.

In the first and second embodiments, the movements of the armature 13 and the rod 3 is limited by the contact between the rod 3 and the stopper 22. Alternatively, the stopper 22 may contact the armature 13 to limit the movements of the armature 13 and the rod 3 toward the one side in the axial direction.

In the first and second embodiments, the electromagnetic valve of the present disclosure is applied to the decompression valve 1, but the application of the electromagnetic valve is not limited to this. The electromagnetic valve of the present disclosure may be applied to a variety of electromagnetic valves in which a rod is fixed to an armature, and movements of the rod and the armature are limited by a stopper.

Additional advantages and modifications will readily occur to those skilled in the art. The disclosure in its broader terms is therefore not limited to the specific details, representative apparatus, and illustrative examples shown and described.

What is claimed is:

1. An electromagnetic valve comprising:
   a housing;
   a rod disposed to be slidable in an axial direction of the rod in the housing;
   an armature having a rod hole through which the rod extends to be fixed to the armature, the armature moving toward one side in the axial direction by a magnetic attraction force upon energization of a solenoid coil;
   a spring engaged with the rod, the spring urging the rod toward an other side in the axial direction, the other side being opposite from the one side; and
   a stopper that limits the movement of the armature by contacting the rod, wherein
   the rod includes a fixed portion extending through the rod hole to be fixed to the armature, and a flange portion located on the one side in the axial direction with reference to the fixed portion,
   the flange portion is larger than the fixed portion and the spring in a radial direction of the rod,
   the flange portion has a radially outer wall that is immediately adjacent to the armature in the radial direction to be surrounded by the armature,
   the flange portion is engaged with the spring on the one side in the axial direction with reference to the flange portion,
   the armature includes a contact portion provided adjacent to an opening of the rod hole that is open toward the one side in the axial direction,
   the contact portion extends in the radial direction,
   the flange portion contacts the contact portion on the one side in the axial direction with reference to the contact portion,
   the rod includes a thin portion located on the one side in the axial direction with reference to the flange portion, and
   the thin portion is smaller than the flange portion in the radial direction, the thin portion having a solid circumferential body projecting into the spring to meet the stopper so as to limit the movement of the armature by contacting the rod.

2. The electromagnetic valve according to claim 1, wherein the flange portion is located at an end of the rod on the one side in the axial direction.

3. The electromagnetic valve according to claim 1, wherein the fixed portion is press-fitted into the rod hole.

4. The electromagnetic valve according to claim 1, wherein the fixed portion is fixed to the armature by welding.

5. The electromagnetic valve according to claim 1, wherein the fixed portion is fixed to the armature by crimping.

6. The electromagnetic valve according to claim 1, wherein the fixed portion is fixed to the armature by brazing.

7. The electromagnetic valve according to claim 1, wherein
   the contact portion has a flat surface extending in the radial direction, and
   the flat surface of the contact portion contacts the flange portion in the axial direction.

8. The electromagnetic valve according to claim 1, wherein
   the flange portion has a flat surface extending in the radial direction, and
   the flat surface of the flange portion contacts the contact portion in the axial direction.

9. The electromagnetic valve according to claim 1, wherein
   the armature includes a large hole that is provided on the one side in the axial direction with reference to the rod hole to be coaxial with the rod hole,
   the large hole is located adjacent to the rod hole to communicate with the rod hole,
   the large hole is larger than the rod hole in the radial direction,
   the contact portion is a step between the rod hole and the large hole which are different with each other in size in the radial direction, and
   the flange portion is located in the large hole.

10. The electromagnetic valve according to claim 1, wherein the contact portion encloses the opening of the rod hole that is open toward the one side in the axial direction.

11. The electromagnetic valve according to claim 1, wherein the contact portion entirely contacts the flange portion.

12. The electromagnetic valve according to claim 1, wherein
    the contact portion has a circular ring shape enclosing the opening of the rod hole that is open toward the one side in the axial direction, and
    the flange portion has a circular shape concentric with the contact portion.

13. The electromagnetic valve according to claim 1, wherein
    the spring is a coil spring,
    the stopper includes a base portion with which an opposite end of the spring from the flange portion is engaged, and a protrusion portion extending from the base portion toward the other side in the axial direction on a radially inner side of the spring, and
    the protrusion portion limits the movement of the armature by contacting the flange portion of the rod.

* * * * *